US010118807B2

(12) United States Patent
Simula et al.

(10) Patent No.: US 10,118,807 B2
(45) Date of Patent: Nov. 6, 2018

(54) FORESTRY WINCH

(71) Applicant: GSE TECHNOLOGIES, LLC, Houghton, MI (US)

(72) Inventors: Glen Raymond Simula, Hancock, MI (US); David Jon McKinstry, Calumet, MI (US)

(73) Assignee: GSE TECHNOLOGIES, LLC, Houghton, MI (US)

( * ) Notice: Subject to any disclaimer, the term of this patent is extended or adjusted under 35 U.S.C. 154(b) by 196 days.

(21) Appl. No.: 15/042,582

(22) Filed: Feb. 12, 2016

(65) Prior Publication Data

US 2016/0159623 A1 Jun. 9, 2016

Related U.S. Application Data

(63) Continuation-in-part of application No. 13/897,742, filed on May 20, 2013, now Pat. No. 9,260,277.

(51) Int. Cl.
*B66D 1/20* (2006.01)
*B66D 1/14* (2006.01)
(Continued)

(52) U.S. Cl.
CPC .............. *B66D 1/20* (2013.01); *A01G 23/095* (2013.01); *A01G 23/099* (2013.01); *B66D 1/14* (2013.01); *B66D 1/60* (2013.01); *B66D 3/006* (2013.01)

(58) Field of Classification Search
CPC ... B66D 1/02; B66D 1/14; B66D 1/20; B66D 1/22; B66D 1/60; B66D 3/006
See application file for complete search history.

(56) References Cited

U.S. PATENT DOCUMENTS 851,521 A * 4/1907 Jones .................. F16G 11/12
254/213
905,065 A * 11/1908 Firth .................... B66C 23/86
188/77 R
(Continued)

FOREIGN PATENT DOCUMENTS

AU 2010202945 A1 7/2010
JP 7232899 A 9/1995
(Continued)

OTHER PUBLICATIONS

International Search Report and Written Opinion; related International application No. PCT/US2014/031205; dated Jul. 21, 2014.
(Continued)

*Primary Examiner* — Michael E Gallion
(74) *Attorney, Agent, or Firm* — Brooks Kushman P.C.

(57) ABSTRACT

A winch system 10 coupled to a processor energy source 12 having one or more processor driving rollers 14. The processor 12 provides energy to the winch system 10. Multiple driven winch drive rollers 32 are supported by the body 18. A horizontally-oriented winch drum 36 is attached to the body 18. A drum gear 38 in communication with the driven rollers 32 and the winch drum 38 transfers rotational energy about the vertical axis from the processor driving rollers 14 to rotational energy about the axis of rotation of the winch drum 38. Attached to the winch drum is a cable 40 having a proximal end 42 region and a distal end region that is detachably attachable to an object 46 to be retrieved by the winch system.

10 Claims, 10 Drawing Sheets

(51) Int. Cl.
*B66D 1/60* (2006.01)
*A01G 23/095* (2006.01)
*A01G 23/099* (2006.01)
*B66D 3/00* (2006.01)

(56) References Cited

U.S. PATENT DOCUMENTS

| | | | | |
|---|---|---|---|---|
| 1,245,522 | A * | 11/1917 | Stimmel | F16D 43/26 |
| | | | | 192/139 |
| 1,529,579 | A * | 3/1925 | Dorsey | A01G 23/062 |
| | | | | 180/53.1 |
| 2,348,382 | A * | 5/1944 | Halby | B66D 1/14 |
| | | | | 192/45.1 |
| 2,366,433 | A * | 1/1945 | Bridwell | B66D 1/14 |
| | | | | 192/17 R |
| 2,450,718 | A * | 10/1948 | Darnell | B66D 1/26 |
| | | | | 254/287 |
| 2,534,583 | A * | 12/1950 | Emmons | B66D 1/20 |
| | | | | 254/358 |
| 2,606,745 | A * | 8/1952 | Ball | B66D 1/00 |
| | | | | 180/6.7 |
| 2,671,880 | A * | 3/1954 | Symonds | B66D 1/12 |
| | | | | 226/194 |
| 2,681,205 | A * | 6/1954 | Bannister | B66C 23/78 |
| | | | | 192/12 R |
| 2,929,494 | A | 3/1960 | Lombardi | |
| 3,088,709 | A * | 5/1963 | Hunt | B66D 1/20 |
| | | | | 254/323 |
| 3,667,312 | A * | 6/1972 | Dahl | B66D 1/02 |
| | | | | 254/343 |
| 3,738,614 | A * | 6/1973 | Peterson | B66D 1/20 |
| | | | | 192/17 R |
| 3,985,047 | A | 10/1976 | Therkelsen | |
| 4,196,889 | A * | 4/1980 | Dudek | B66D 1/22 |
| | | | | 254/344 |
| 4,426,064 | A | 1/1984 | Healy | |
| 4,854,547 | A | 8/1989 | Oliphant | |
| 5,245,769 | A | 9/1993 | Wammock | |
| 5,386,970 | A | 2/1995 | Trant | |
| 5,507,471 | A | 4/1996 | Mercurio | |
| 5,607,143 | A * | 3/1997 | Regal | B66D 1/04 |
| | | | | 254/342 |
| 5,946,970 | A | 9/1999 | Fraley et al. | |
| 6,241,215 | B1 * | 6/2001 | Gersemsky | A61G 7/1015 |
| | | | | 254/342 |
| 6,422,538 | B1 * | 7/2002 | Rumfield | B66D 1/02 |
| | | | | 254/343 |
| 6,474,377 | B1 * | 11/2002 | Van De Mortel | A01G 23/0955 |
| | | | | 144/208.2 |
| 6,705,597 | B1 | 3/2004 | Reilly et al. | |
| 6,960,107 | B1 * | 11/2005 | Schaub | B63H 23/08 |
| | | | | 192/21 |
| 7,478,795 | B2 * | 1/2009 | Grapes | 254/333 |
| 7,909,308 | B2 | 3/2011 | Lauder et al. | |
| 7,922,153 | B2 * | 4/2011 | Zhou | B66D 1/22 |
| | | | | 254/323 |
| 2006/0169961 | A1 * | 8/2006 | Ledford | B66D 1/14 |
| | | | | 254/342 |
| 2007/0194290 | A1 * | 8/2007 | Fofonoff | B66D 1/7415 |
| | | | | 254/325 |
| 2009/0308826 | A1 * | 12/2009 | Kempf | B66C 9/02 |
| | | | | 212/270 |
| 2010/0051890 | A1 * | 3/2010 | Lauder | B64C 27/10 |
| | | | | 254/382 |
| 2011/0079760 | A1 | 4/2011 | Kempf | |
| 2013/0112931 | A1 * | 5/2013 | Bulling | B66D 1/12 |
| | | | | 254/266 |
| 2014/0061558 | A1 * | 3/2014 | Einhorn | B66D 1/39 |
| | | | | 254/331 |
| 2014/0084229 | A1 * | 3/2014 | Morrison | B66D 1/00 |
| | | | | 254/344 |
| 2014/0341696 | A1 * | 11/2014 | Simula | B66D 1/14 |
| | | | | 414/800 |
| 2015/0083985 | A1 * | 3/2015 | Lervik | B63B 21/22 |
| | | | | 254/340 |
| 2015/0137054 | A1 * | 5/2015 | Smith | B66D 1/38 |
| | | | | 254/323 |
| 2015/0375975 | A1 * | 12/2015 | Flateland | B66D 1/7405 |
| | | | | 254/310 |
| 2016/0159623 | A1 * | 6/2016 | Simula | B66D 1/20 |
| | | | | 414/800 |

FOREIGN PATENT DOCUMENTS

| | | |
|---|---|---|
| WO | 2014189606 A1 | 11/2014 |
| WO | 2015193809 | 12/2015 |

OTHER PUBLICATIONS

International Preliminary Report on Patentability; related International application No. PCT/2014/031205; dated Nov. 24, 2015.
International Search Report and Written Opinion; International Application Serial No. PCT/US2017/017284; dated May 1, 2017.
International Preliminary Report on Patentability; related International application No. PCT/US2014/031205; dated Nov. 24, 2015.
International Search Report and Written Opinion; International application No. PCT/US2014/031205; dated Jul. 21, 2014.
EP Supplemental Search Report dated Jan. 27, 2017, EP Appn. No. 14800534.1, 11 pgs.

* cited by examiner

FORESTRY WINCH

CROSS REFERENCE TO RELATED APPLICATION

This application is a continuation in part of U.S. Ser. No. 13/897,742 filed on May 20, 2013, now issued as U.S. Pat. No. 9,260,277 issued Feb. 16, 2016, the disclosure of which is incorporated in its entirety by reference herein.

TECHNICAL FIELD

Background (1) Field of the Invention

The present disclosure relates to a winch system coupled to a processor that energizes the winch system, usually in a forestry environment.

(2) Related Art

Particularly in the lumber business, it is known that there are challenges imposed by remote locations, hard-to-reach job sites, the size and weight of trees to be felled and the movement after felling of heavy, unstable trees and limbs. To meet such challenges, machinery has been developed that deploy tree and limb processors. Examples include equipment made by Waratah, such as the HTH625C harvester head—http://www.waratah.net.

The following patent numbers were considered before filing this patent application: JP 7232899; AU 2010/202945; U.S. Pat. No. 6,705,597; and U.S. Pat. No. 5,386,970.

SUMMARY

One embodiment of the present disclosure includes a winch system by which the disclosed method is practiced.

The disclosure also includes a method for ensnaring an object such as a tree limb before it is felled to influence the direction in which it is to fall or after it is felled and pulling it toward a processor that de-limbs or prunes and optionally cuts the limb to length.

The winch system is coupled to a processor energy source having one or more processor driving rollers, the processor providing energy to the winch system. The winch system has a body having a front face, a back face, lateral side faces, a top, a bottom, an imaginary horizontal axis extending between the lateral side faces, an imaginary vertical axis extending between the top and the bottom, the body being detachably attachable to the processor energy source;

multiple driven rollers that are driven by the one or more processor driving rollers, the driven rollers being supported between the top and the bottom of the body so that they are rotatable about axes that are parallel to the vertical axis in response to the one or more processor driving rollers;

a winch drum supported by the body and extending between the lateral side faces, the winch drum having an axis of rotation that is parallel to the horizontal axis of the body;

a drum gear in communication with the driven rollers and the winch drum that transfers rotational energy about the vertical axis from the processor driving rollers to rotational energy about the axis of rotation of the winch drum and influences the speed and direction of winch drum rotation; and a cable that is adapted to wrap around the winch drum, the cable extending from the front or back faces, the cable having a proximal end region attached to the winch drum and a distal end region that is detachably attachable to an object to be retrieved by the winch system.

One way of operating the disclosed apparatus involves these steps, not all of which need to be practiced, nor in the sequence set forth:

A. lowering the processor and the pair of driving rollers over the winch system 10;

B. engaging the processor driving rollers with the driven winch drive rollers so that in one embodiment each processor driving roller engages two winch driven rollers;

C. securing the distal end of the cable to or around an object to be pulled; and D. rotating the processor driving rollers and the driven winch drive rollers and drum to apply tension to and pull in the cable and the ensnared object so that the object may be retrieved or the direction in which it may fall is influenced.

DETAILED DESCRIPTION

Figure 1:
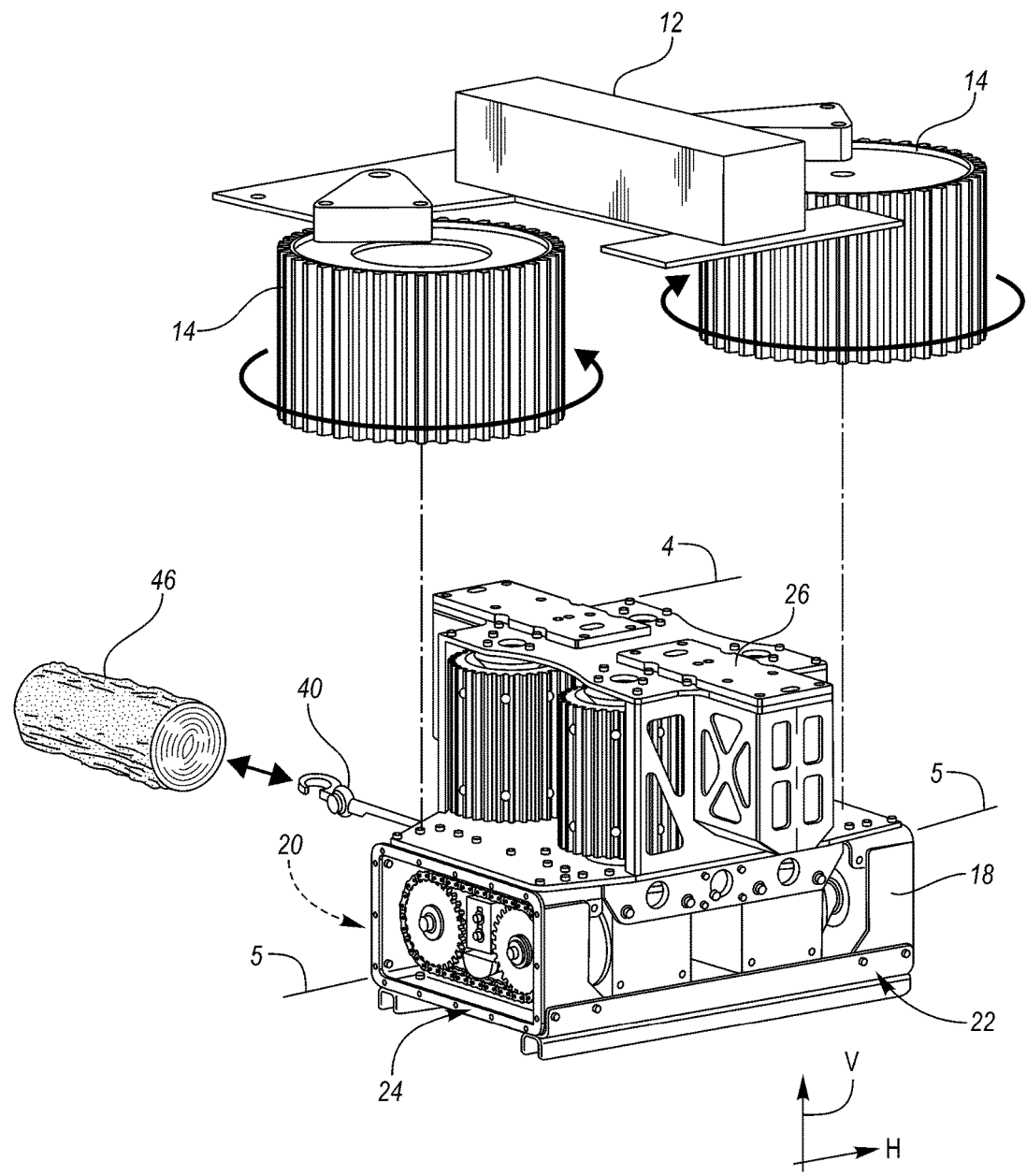
FIG. 1 is a quartering perspective view of a winch system as disclosed herein.
Figure 2:
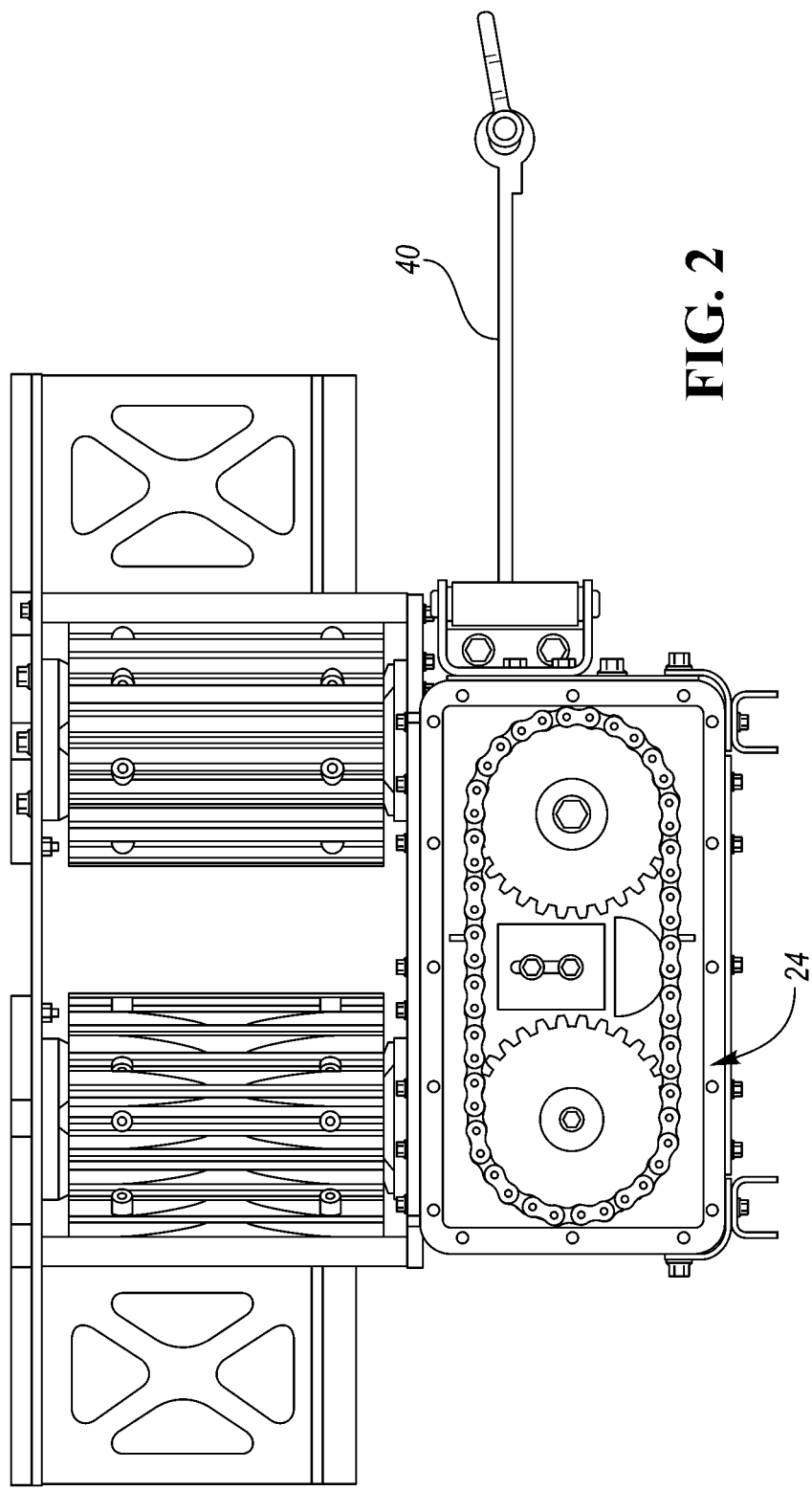
FIG. 2 is a view of the left-hand side of the winch system shown in FIG. 1.
Figure 3:
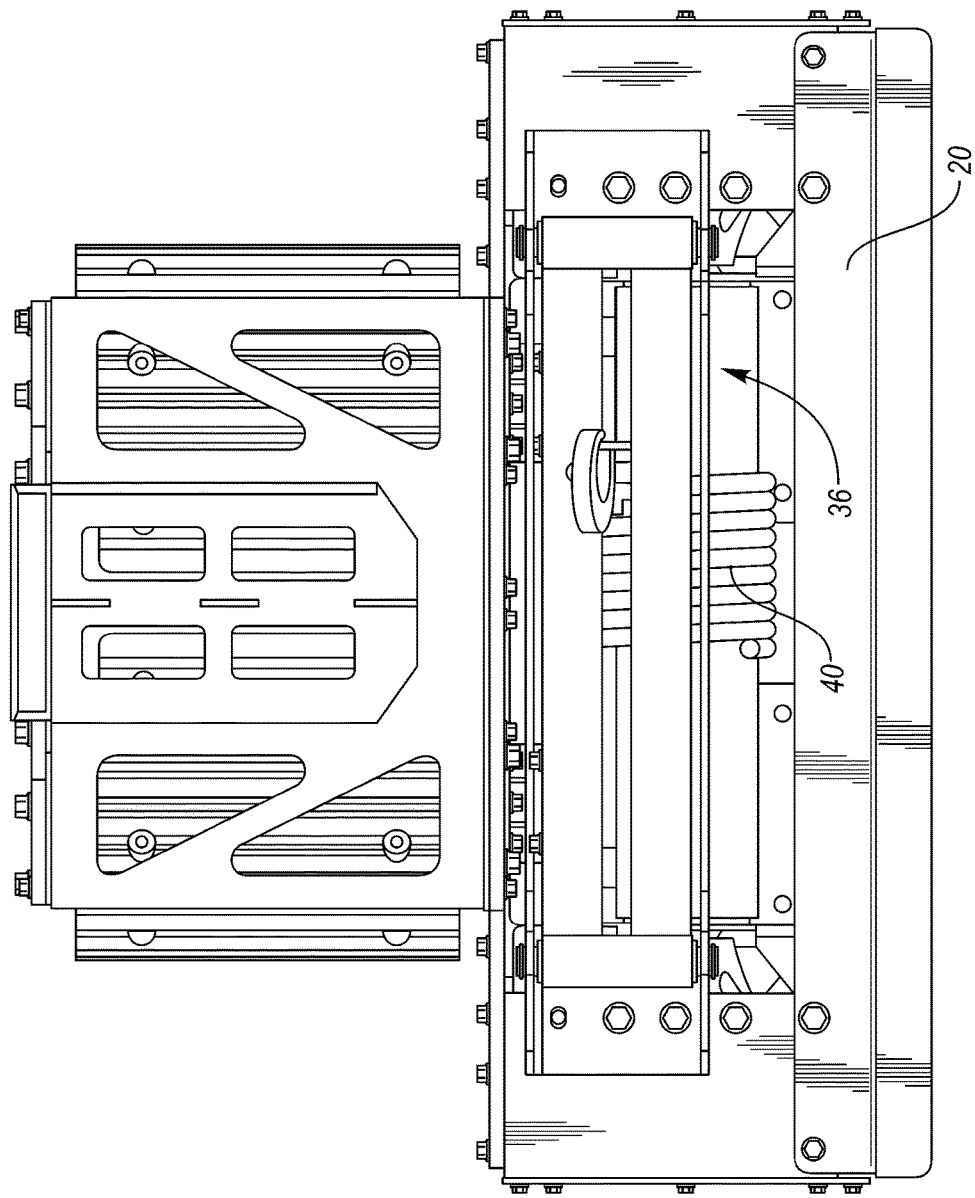
FIG. 3 is a view of the rear of the winch system.
Figure 4:
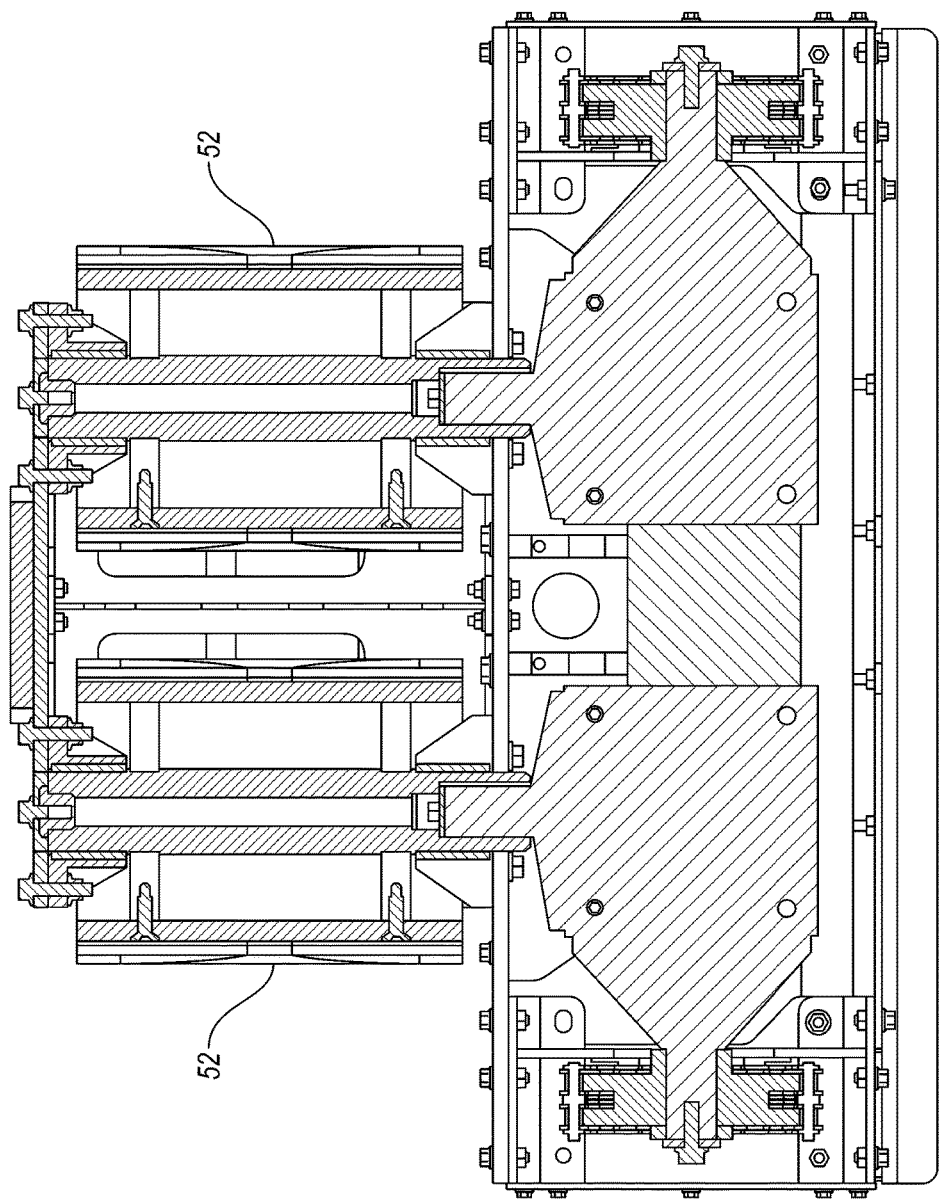
FIG. 4 is a vertical sectional view of the system shown in FIG. 1 taken along the line 4-4 thereof.
Figure 5:
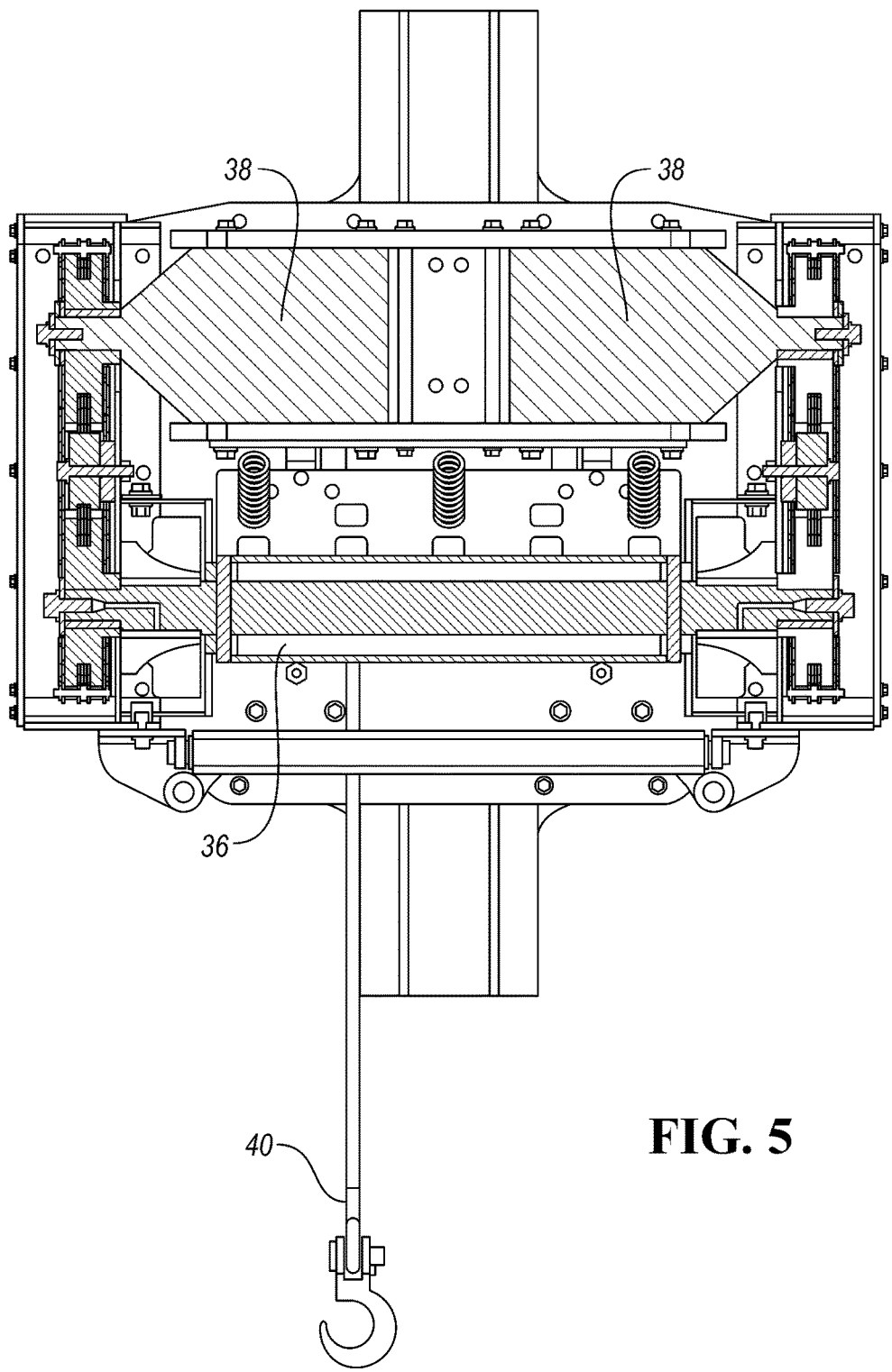
FIG. 5 is a horizontal sectional view of the system shown in FIG. 1 taken along the line 5-5 thereof.

A winch system 10 (FIGS. 1-5) is coupled to a processor energy source 12 having one or more processor driving rollers 14 and optionally crab claw-like knives 16. The processor 12 provides energy to the winch system 10 through driving rollers 14 that optionally are reversible. The winch system 10 has a body 18 (FIG. 1) with a front face 20 (from which optionally a cable 40 extends), a back face 22, lateral sides 24, a top 26, a bottom 28 an imaginary vertical axis (V-V) and an imaginary horizontal axis (H-H). Multiple driven winch drive rollers 32 (preferably two) are supported between the top 26 and bottom 28 so that they are rotatable about axes that are parallel to the vertical axis (V-V) in response to the one or more processor driving rollers 14.

A winch drum 36 (FIGS. 3 & 5) is supported by the body 18 so that it rotates about an axis that is parallel with the horizontal axis (H-H). Associated with the winch drum 36 is a drum gear 38 in communication with the driven rollers 50,52. The drum gear 38 transfers rotational energy about the vertical axis V-V from the processor driving rollers 14 to rotational energy about the axis of rotation H-H of the winch drum 36 and optionally influences the speed and direction of winch drum rotation. A cable 40 extends from or wraps around the winch drum 36. The cable 40 has a proximal end 42 region attached to the winch drum 36 and a distal end region 44 that is detachably attachable to an object 46 to be retrieved by and pulled or hauled towards the winch system 36. The cable 40 extends outwardly from the front 20 or back 22 faces of the body 18.

It will be appreciated that the term "horizontal" should not be strictly construed. In practice, this term suggests a frame of reference in relation to the body 18 of the winch system. It may be that the environment of use may be inclined to a truly horizontal plane. Similarly for the term "vertical". It also should not be strictly construed, except that the vertical axis should be considered orthogonal to the horizontal axis.

If desired, a reverse gear 48 is mounted so that it rotates with the driven winch drive rollers 32 in a plane that lies perpendicularly to the vertical axis V-V.

Figure 6:
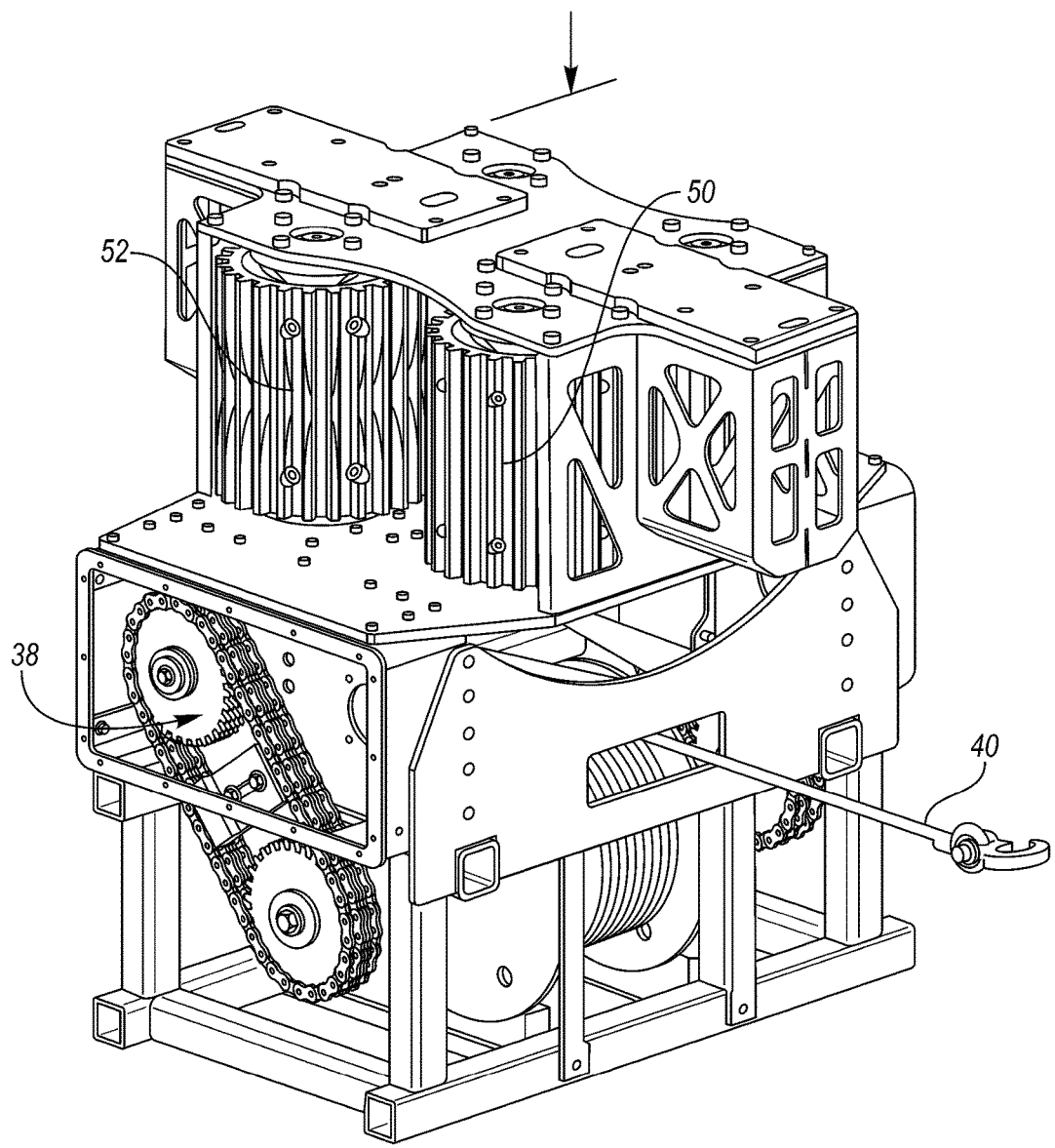
FIG. 6 is a quartering perspective view of an alternate embodiment of the winch system.
Figure 7:
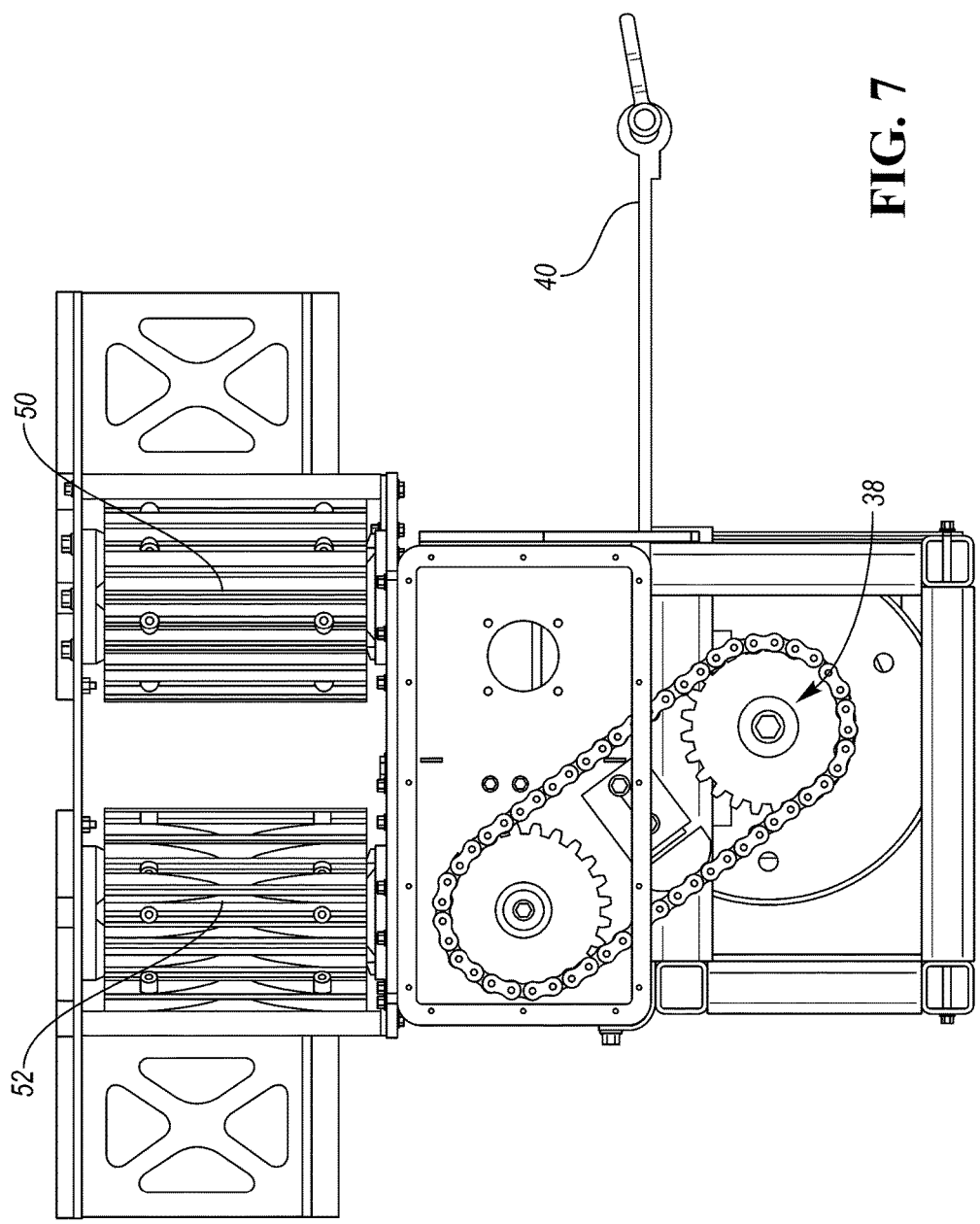
FIG. 7 is a view of the left-hand side of the winch system shown in FIG. 6.
Figure 8:
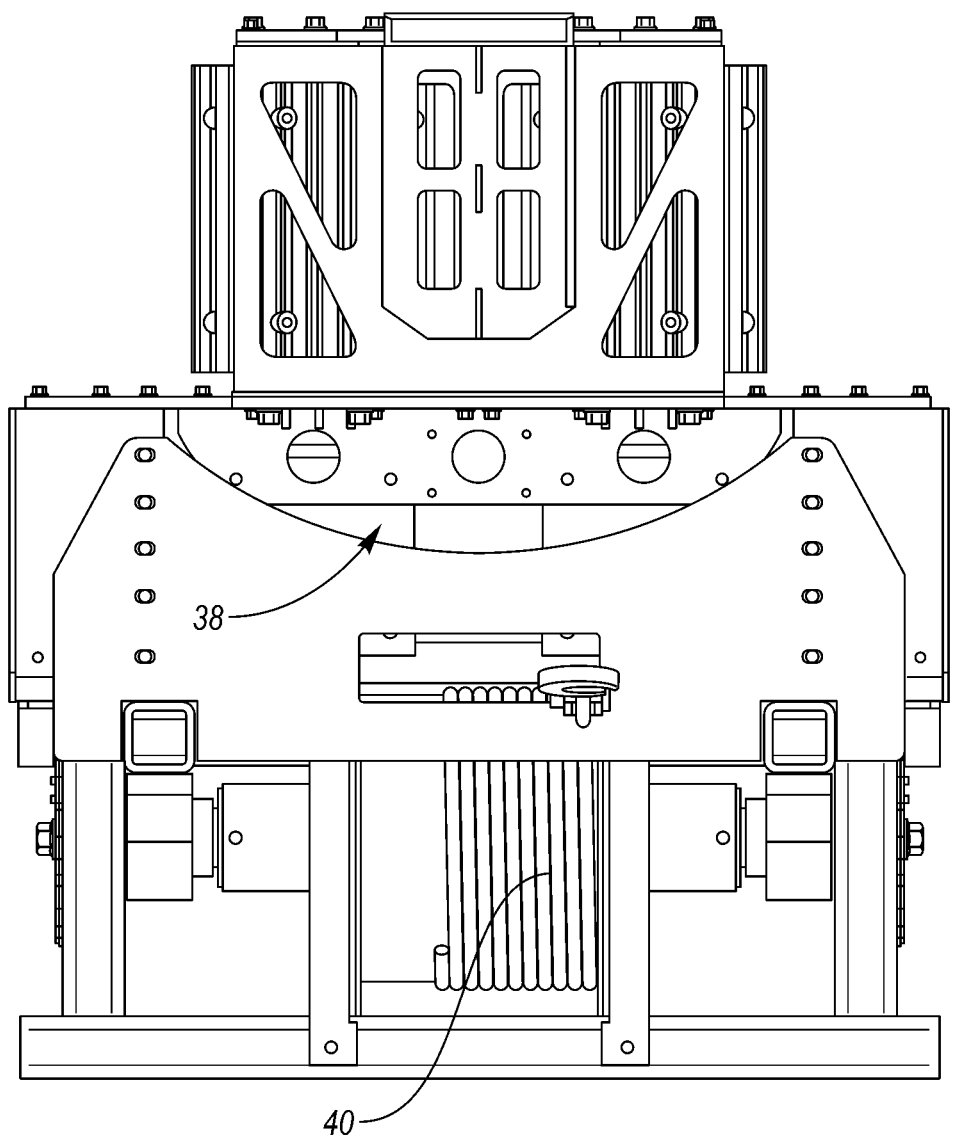
FIG. 8 is a view of the rear of the winch system shown in FIG. 6.
Figure 9:
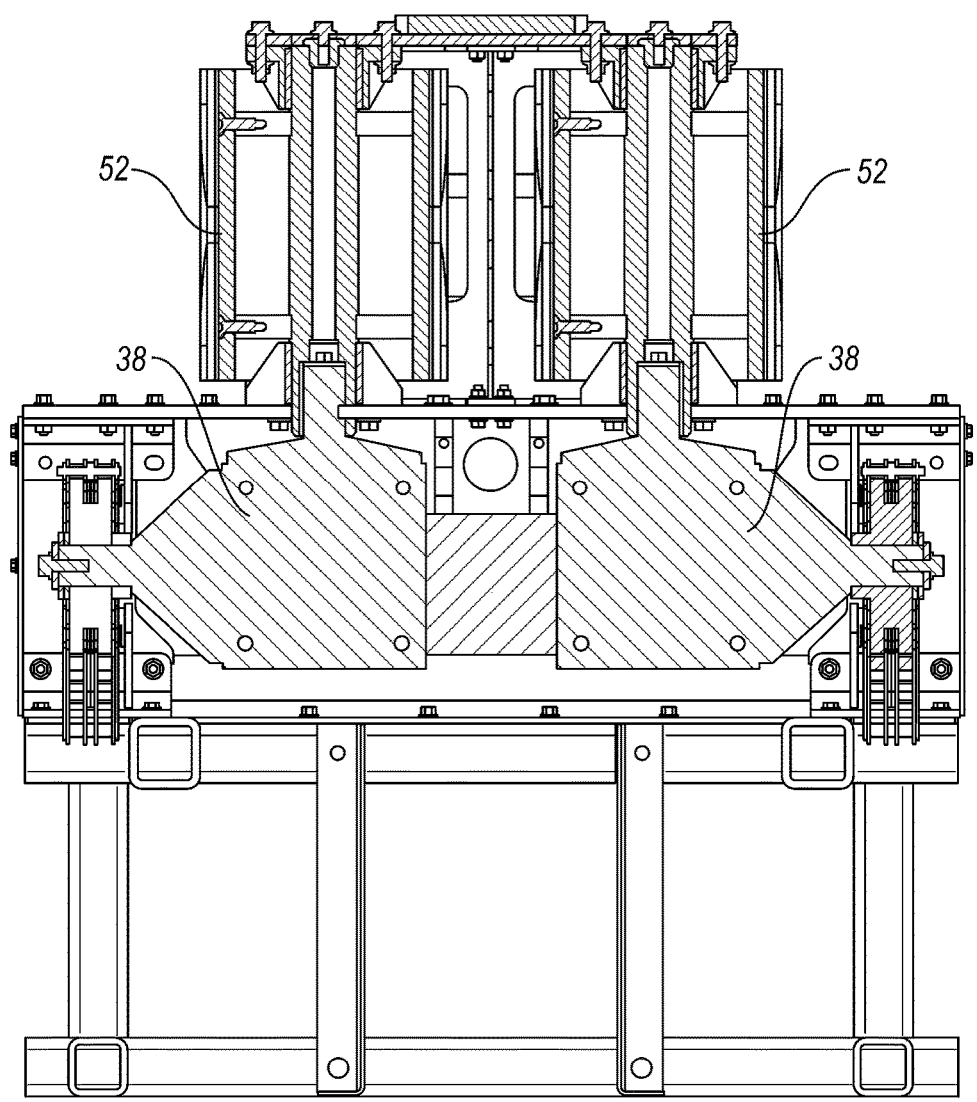
FIG. 9 is vertical sectional view of the system shown in FIG. 6 taken along the line 9-9 thereof.
Figure 10:
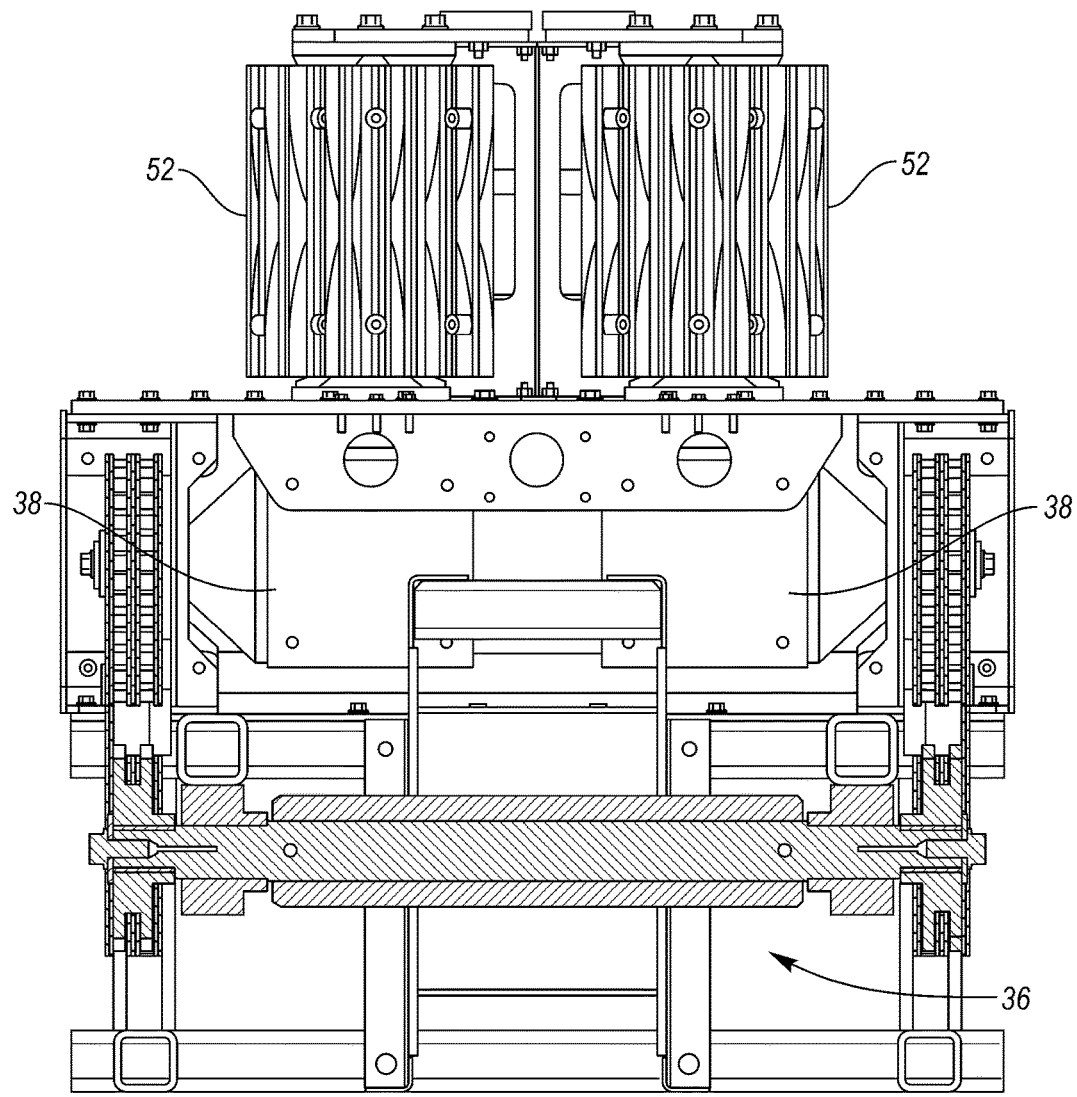
FIG. 10 is another vertical sectional view of the system shown in FIG. 6.

In alternate embodiments (see FIG. 6 onwards) the drive gear 38 includes two sprockets, a belt or chain (collectively, "chain") that surrounds them, and a gearbox. If desired, the sprockets may be oriented in a horizontal line, as suggested in the embodiments depicted in FIGS. 1-5. Alternatively, the sprockets could be oriented so that one is higher than the other. In practice, this may facilitate visual inspection by an operator. One form of drum gear 38 is the Superior Gearbox 600 series (preferably the 1:1 ratio box). See, www.superiorgearbox.com.

In one embodiment, the processor driving rollers 14 of the processor energy source 12 include two processor driving rollers 14. Preferably, the one or more driven winch drive rollers 32 of the winch system 10 comprise four rollers.

Where there are four driven rollers, two rollers 50 are mounted adjacent the front face 20 of the winch system 10 and two rollers 52 are mounted adjacent the back face 22 of the winch system 10. In such a case, the reverse gear 48 intermeshes between the front two 50 winch system gears.

Preferably the cable 40 extends from the body 18 between the front two driven rollers 50.

In use, the disclosed apparatus for ensnaring and retrieving objects 46 comprises in combination a winch system 10, as described above and a processor energy source 12 to which the winch system 10 is coupled. The processor energy source 12 has multiple processor driving rollers 14 and some embodiments have crab claw-like knives 16.

As used herein the term "winch" connotes a mechanical device that is used to pull in (wind up) or let out (wind out) or otherwise adjust the "tension" of a rope or wire rope (also called a "cable" or "wire cable"). En.wikipedia.org/wiki/Winch. In its simplest form, it consists of a spool and an attached hand crank. Id. The spool can also be called the winch drum. Id. Some designs have gear assemblies and can be powered by electric, hydraulic, pneumatic or internal combustion drives. Id. Some may include a solenoid brake and/or a mechanical brake or ratchet and pawl device that prevents it from unwinding unless the pawl is retracted.

Preferably, the cable is wound under tension. In practice, is often helpful that the cable be spooled with a minimum tension of about 10-15% of the working load. The smaller the ratio between the drum diameter and cable diameter, the more tension is needed. An insufficient tension allows the cable to cut down between lower wraps. This tends to cause damage to the cable.

An ideal ratio between the drum diameter and the cable diameter is 25:1 or greater. And ANSI/ASME standard sets a minimum of 15:1 for pulling and 18:1 for lifting. In one set of experiments, the drum diameter was 5 inches, and the wire diameter was 0.63 inches. In that example, the ratio was 9:1.

Relevant to smooth spooling is the angle (fleet angle) at which the cable comes off the sheave and into the winch. Preferably, the fleet angle should lie between 0.5° and 1.5°. In practice, it is desirable that the winch be mounted so that it shaft is at a 90 degree angle relative to a line that extends from the center of the drum to the first object to be engaged or a sheave. Failure to align the winch will prevent the cable from winding onto the drum as it should.

A common arrangement is for the winch cable to leave the drum and go through a fixed sheave or block. Grooved drums can help the cable spool correctly. For example, a helical groove can be provided to facilitate multi-layer applications that results in additional layers of cable lying at a crosswise angle to the lower layers.

In use, one method for operating the winch system 10 involves the processor 12 descending from above and engaging the winch system 10. After engagement, the winch system 10 is coupled to the movable processor 12.

One embodiment of the processor 12 has a pair of processor driving rollers 14 and openable claw-like knives 16. Via a gearing system, the processor 12 provides rotational, translational and potential energy to the winch system 10. The gearing system rotates, stops or reverses the rotation of a drum 36 around which the cable 40 is wrapped and to which the cable 40 is tethered so that the cable 40 can be extended or retracted without detachment or slippage.

In use, the distal end 58 of the cable is detachably attached to an object 46 to which a pulling force is to be applied. The proximal end 56 is secured to the drum.

One way of operating the disclosed apparatus involves these steps, not all of which need to be practiced, nor in the sequence set forth:

A. lowering the processor 12 and the pair of driving rollers 14 over the winch system 10;

B. engaging the processor driving rollers 14 with the driven winch drive rollers 32 so that in one embodiment each processor driving roller 14 engages two winch driven rollers (e.g. 50 or 52);

C. securing the distal end 56 of the cable 40 to or around an object 46 to be pulled;

D. rotating the processor driving rollers 14 and the driven winch drive rollers 32 and drum 36 to apply tension to and pull in the cable 40 and the ensnared object 46 so that the object 46 may be retrieved or the direction in which it may fall is influenced.

Other steps may be involved:

E. straddling the object 46 with the claw-like knife 16; and

F. removing unwanted appendages (e.g. limbs) from the object 46 as it is retrieved by the cable 40 and passes through the knife 16.

In one example, the pitch diameter of the driving winch rollers 32 was 11.5 inches; that of the reverse gear 48 was 6 inches; and that of the drum 38 was 7 inches. It was observed that the torque on each driven winch drive roller was about 940 lbs and the resulting torque on the drum was about 2200 foot pounds. When the driven winch drive rollers rotated at about 21 rpm, this resulted in the drum rotating at about 34.6 rpm and the energy transferred was about 14.3 horsepower.

In practice, the processor driving rollers 14 are preferably hydraulically driven. When a log is inserted between the rollers 14, it is propelled through the knives. Optionally, the limb can also be cut.

In another embodiment, there are two driven rollers 32 which will provide power to the winch drive 36. This embodiment eliminates the cost of the two additional rollers plus the associated gears.

A further embodiment uses a single processor driving roller located at the bottom of the processor 12 that would drive a single gear 32 which would drive the winch drive hub 36.

A yet further embodiment would use a single processor driving hub to drive a hydraulic motor. Then a hydraulic hose could be routed from the hydraulic motor to the driving hub to provide power to the winch 36. This hydraulic mechanism would allow the drive winch 36 to be positioned in alternate locations and a hydraulic hose to be connected to it instead of gears.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

| Reference No. | Component |
| --- | --- |
| 10 | Winch system |
| 12 | Processor energy source |
| 14 | Processor driving rollers |
| 16 | Crab claw-like knives |
| 18 | Body |
| 20 | Front face |
| 22 | Back face |
| 24 | Lateral sides |
| 26 | Top |
| 28 | Bottom |
| A-A | Imaginary vertical axis |
| 32 | Driven winch drive rollers |
| 36 | Winch drum |
| 38 | Drum gear |
| 40 | Cable |
| 42 | Proximal end region |
| 44 | Distal end region |
| 46 | Object to be retrieved |
| 48 | Reverse gear |
| 50 | Two rollers mounted adjacent the front face |
| 52 | Two rollers mounted adjacent the back face |
| 56 | Proximal end |
| 59 | Distal end |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A winch system coupled to a processor energy source having multiple processor driving rollers, the processor providing energy to the winch system, the winch system comprising
a body having a front face, a back face, lateral side faces, a top, a bottom, an imaginary horizontal axis extending between the lateral side faces, an imaginary vertical axis extending between the top and the bottom, the body being detachably attachable to the processor energy source;
multiple driven rollers that are driven by the processor driving rollers, the driven rollers being supported between the top and the bottom of the body so that they are rotatable about axes that are parallel to the vertical axis in response to the processor driving rollers;
a winch drum supported by the body and extending between the lateral side faces, the winch drum having an axis of rotation that is parallel to the horizontal axis of the body;
a drum gear in communication with the driven rollers and the winch drum that transfers rotational energy about the vertical axis from the processor driving rollers to rotational energy about the axis of rotation of the winch drum and influences the speed and direction of winch drum rotation, wherein the drum gear includes a pair of sprockets and a chain extending around the pair, the chain being adapted to transfer rotary motion from one socket to the other socket in the pair, the sprockets being aligned along an imaginary angled axis so that one is higher than the other; and
a cable that is adapted to wrap around the winch drum, the cable extending substantially horizontally from the front or back faces, the cable having a proximal end region attached to the winch drum and a distal end region that is detachably attachable to an object to be retrieved by the winch system, the distal end region influencing the direction in which the object may fall, the object being located laterally away from the winch system.

2. The winch system of claim 1, wherein the multiple processor driving rollers of the processor energy source include two processor driving rollers.

3. The winch system of claim 1, wherein the multiple driven rollers of the winch system comprise four rollers.

4. The winch system of claim 3, wherein the four rollers include two rollers mounted adjacent the front face of the winch system and two rollers mounted adjacent the back face of the winch system.

5. The winch system of claim 4, wherein a reverse gear is mounted so that it rotates two of the driven rollers in a plane that lies perpendicularly to the vertical axis, the reverse gear intermeshing between a front and a back roller.

6. The winch system of claim 5, wherein the cable extends from the body between the front two driven rollers substantially in parallel with the horizontal axis when the cable is under tension.

7. The winch system of claim 5, wherein the cable extends from the body between the back two driven rollers substantially in parallel with the horizontal axis when the cable is under tension.

8. A machine for ensnaring objects comprising in combination:
a winch system; and
a processor energy source to which the winch system is coupled, the processor energy source having multiple processor driving rollers, the processor providing energy to the winch system,
the winch system comprising
a body having a front face, a back face, lateral side faces, a top, a bottom, an imaginary horizontal axis extending between the lateral side faces, an imaginary vertical axis extending between the top and the bottom, the body being detachably attachable to the processor energy source;

multiple driven rollers that are driven by the one or more processor driving rollers, the driven rollers being supported between the top and the bottom of the body so that they are rotatable about axes that are parallel to the vertical axis in response to the one or more processor driving rollers;

a winch drum supported by the body and extending between the lateral side faces, the winch drum having an axis of rotation that is parallel to the horizontal axis of the body;

a drum gear in communication with the driven rollers and the winch drum that transfers rotational energy about the vertical axis from the processor driving rollers to rotational energy about the axis of rotation of the winch drum and influences the speed and direction of winch drum rotation, wherein the drum gear includes a pair of sprockets and a chain extending around the pair, the chain being adapted to transfer rotary motion from one socket to the other socket in the pair; and a cable that is adapted to wrap around the winch drum, the cable extending substantially horizontally from the front or back faces, the cable having a proximal end region attached to the winch drum and a distal end region that is detachably attachable to an object to be retrieved by the winch system, the distal end region influencing the direction in which the object may fall, the object being located laterally away from the winch system.

9. A method for operating a winch system with a drum, the winch system being coupled to a movable processor having one or more driving processor rollers, the processor providing energy to the winch system that applies tension to a cable having a distal end that is detachably attached to an object against which a pulling force is to be applied and a proximal end that wraps around and is secured to the drum, the winch system comprising:

a body having a front face, a back face, lateral side faces, a top, a bottom, an imaginary horizontal axis extending between the lateral side faces, and an imaginary vertical axis extending between the top and the bottom, the body being detachably attachable to the processor energy source;

multiple driven rollers that are driven by the one or more processor driving rollers, the driven rollers being supported between the top and the bottom of the body so that they are rotatable about axes that are parallel to the vertical axis in response to the one or more processor driving rollers;

the winch drum being supported by the body and extending between the lateral side faces, the winch drum having an axis of rotation that is parallel to the horizontal axis of the body;

a drum gear in communication with the driven rollers and the winch drum that transfers rotational energy about the vertical axis from the processor driving rollers to rotational energy about the axis of rotation of the winch drum wherein the drum gear includes a pair of sprockets and a chain extending around the pair, the chain being adapted to transfer rotary motion from one socket to the other socket in the pair, the sprockets being aligned along an imaginary angled axis so that one is higher than the other; and a cable that is adapted to wrap around the winch drum, the cable extending substantially horizontally from the front or back faces, the cable having a proximal end region attached to the winch drum and a distal end region that is detachably attachable to an object to be retrieved by the winch system, the distal end region optionally influencing the direction in which the object may fall, the object being located laterally away from the winch system, the method including the steps not necessarily practiced in the order presented, of:

A. lowering the processor and the one or more driving processor rollers over the winch system;

B. engaging the driving processor rollers with the driven winch rollers so that each processor driving roller engages one or more winch driven rollers;

C. securing the distal end of the cable to the object to be engaged;

D. rotating the processor driving rollers and the driven winch rollers to apply tension to the cable and the object so that the object may be pulled or retrieved towards or across intervening terrain.

10. The method of claim 9, further comprising the step of:

E. straddling the object with blades that comprise an openable and closable claw-like knife.

\* \* \* \* \*